(12) United States Patent
Lavertu et al.

(10) Patent No.: US 11,192,458 B2
(45) Date of Patent: Dec. 7, 2021

(54) HYBRID PROPULSION SYSTEM AND METHOD OF CONTROLLING SAME

(71) Applicant: GENERAL ELECTRIC COMPANY, Schenectady, NY (US)

(72) Inventors: Thomas Michael Lavertu, Ballston Lake, NY (US); Victor Salazar, Clifton Park, NY (US); Roy James Primus, Niskayuna, NY (US)

(73) Assignee: Transportation IP Holdings, LLC, Norwalk, CT (US)

( * ) Notice: Subject to any disclaimer, the term of this patent is extended or adjusted under 35 U.S.C. 154(b) by 378 days.

(21) Appl. No.: 16/234,586

(22) Filed: Dec. 28, 2018

(65) Prior Publication Data
US 2020/0207218 A1    Jul. 2, 2020

(51) Int. Cl.
*B60L 50/61* (2019.01)
*B60L 50/10* (2019.01)
*B60W 20/20* (2016.01)

(52) U.S. Cl.
CPC ............... *B60L 50/61* (2019.02); *B60L 50/10* (2019.02); *B60W 20/20* (2013.01); *B60L 2200/26* (2013.01); *B60W 2555/20* (2020.02); *B60W 2555/40* (2020.02)

(58) Field of Classification Search
CPC ............. B60W 20/20; B60W 2555/20; B60W 2510/244; B60W 20/12; B60L 2200/26; B60L 58/12; B60L 2240/642; B61C 7/04; Y02T 10/70
See application file for complete search history.

(56) References Cited

U.S. PATENT DOCUMENTS

| | | | | |
|---|---|---|---|---|
| 2011/0166740 A1* | 7/2011 | Desborough | ......... | B60W 10/08 701/31.4 |
| 2015/0329102 A1* | 11/2015 | Yoshikawa | ........... | B60W 20/20 701/22 |

OTHER PUBLICATIONS

U.S. Appl. No. 16/234,584, "Hybrid Propulsion System And Method Of Controlling Same," filed Dec. 28, 2018.

* cited by examiner

*Primary Examiner* — Navid Ziaeianmehdizadeh
(74) *Attorney, Agent, or Firm* — The Small Patent Law Group LLC; Joseph M. Butscher

(57) ABSTRACT

A system for controlling a hybrid propulsion system includes a computer programmed to obtain altitude and terrain information associated with a predetermined route for the hybrid propulsion system comprising a first energy source and a second energy source. The computer is also programmed to obtain current and forecast ambient weather information associated with the predetermined route of the hybrid propulsion system, determine a power requirement and a torque requirement of the hybrid propulsion system associated with the altitude and the terrain along the predetermined route of the hybrid propulsion system, generate a trip plan to optimize at least one of a plurality of performance parameters of the hybrid propulsion system as the hybrid propulsion system travels along the predetermined route, and preferentially select the first energy source and/or the second energy source based on the trip plan.

22 Claims, 4 Drawing Sheets

HYBRID PROPULSION SYSTEM AND METHOD OF CONTROLLING SAME

The invention relates generally to hybrid vehicles and more particularly to a hybrid locomotive energy management system and to a method of using the system.

BACKGROUND

In operating a vehicle such as a locomotive, some of the factors that an operator typically takes into account include environmental conditions, grade or slope, track or path curvature, speed limits, vehicle size, weight of the cargo, and distribution of that weight. Operation of the vehicle may be determined in part by a locomotive control system configured to automatically accelerate and decelerate the vehicle.

The locomotive control system having, for example, a trip optimizing system may benefit from a database that depicts track or path features such as altitudes and terrain details and locations. Such features may be input to an optimizing program that includes locator elements to determine location of the locomotive, track characterization elements, sensors for measuring operating conditions, and the like. The optimizing program typically include locomotive power description, performance of locomotive traction transmission, consumption of energy from the engine fuel as a function of output power, and other system performance characteristics that may enable system performance to be modeled. The optimizing program may be an algorithm embodied within a processor to optimize performance about an objective function that may include, as examples, minimizing travel time, minimizing transitions between power settings (notches), and minimizing emissions, as examples.

In conventional hybrid locomotive systems with power supplied by an engine and a battery, a control system typically optimizes factors such as fuel consumption, NOx emission, state of charge of the battery, without accounting for ambient weather conditions such as temperature and pressure at several different points along a route of travel. Further, traditional optimizing programs, if not explicitly formulated for a hybrid locomotive system operation, run the risk of operating the battery and the engine without prior knowledge leading to higher fuel consumption and/or potentially reduced component life.

There remains scope for improving energy efficiency in hybrid vehicle optimizing programs.

BRIEF DESCRIPTION

According to one aspect of the invention, a system for controlling a hybrid propulsion system includes a computer programmed to obtain altitude and terrain information associated with a predetermined route for the hybrid propulsion system comprising a first energy source and a second energy source. The computer is also programmed to obtain current and forecast ambient weather information associated with the predetermined route of the hybrid propulsion system, determine a power requirement and a torque requirement of the hybrid propulsion system associated with the altitude and the terrain along the predetermined route of the hybrid propulsion system, generate a trip plan to optimize at least one of a plurality of performance parameters of the hybrid propulsion system as the hybrid propulsion system travels along the predetermined route, and preferentially select the first energy source and/or the second energy source based on the trip plan.

In accordance with another aspect of the invention, a method of controlling a hybrid propulsion system includes obtaining altitude and terrain information of a predetermined route for the hybrid propulsion system to travel comprising a first energy source and a second energy source. The method also includes obtaining ambient weather information along the predetermined route of the hybrid propulsion system, determining a power requirement and a torque requirement of the hybrid propulsion system associated with the altitude and the terrain along the predetermined route of the hybrid propulsion system, generating a trip plan optimizing a plurality of operational parameters of the hybrid propulsion system as the hybrid propulsion system travels along the predetermined route, and preferentially selecting the first energy source and/or the second energy source based on the trip plan.

In accordance with yet another aspect of the invention, a propulsion system includes a hybrid power source to provide power to drive the propulsion system via a power transmission line, the hybrid power source comprising an internal combustion (IC) engine and an electric motor, wherein the IC engine is coupled to the power transmission line, a bank of batteries coupled to the electric motor, a selection device and a computer. The selection device is arranged to selectively couple the electric motor to the power transmission line.

The propulsion system also includes a computer configured to obtain altitude and terrain information associated with a predetermined route for the hybrid propulsion system that includes a first energy source and a second energy source and to obtain ambient weather information associated with the predetermined route of the hybrid propulsion system. The computer is also configured to determine a power requirement and a torque requirement of the hybrid propulsion system associated with the altitude and the terrain along the predetermined route of the hybrid propulsion system and generate a trip plan to optimize at least one of a plurality of performance parameters of the hybrid propulsion system as the hybrid propulsion system travels along the predetermined route, and preferentially select the first energy source and/or the second energy source based on the trip plan.

Various other features will be apparent from the following detailed description and the drawings.

BRIEF DESCRIPTION OF THE DRAWINGS

The drawings illustrate an embodiment of the invention. For ease of illustration, a locomotive and track system has been identified, but other propulsion systems and propulsion system routes are included except were language or context indicates otherwise.

DETAILED DESCRIPTION

The invention includes embodiments that relate to route navigation systems. The invention includes embodiments that relate to methods for generating optimized trips for a hybrid propulsion system.

Further, the invention is described with respect to a hybrid engine of a locomotive as a non-limiting example. However, one skilled in the art will recognize that the embodiments and methods illustrated herein may be broadly applied to hybrid propulsion systems in general. These exemplary hybrid propulsion systems include all-battery locomotives within a consist of standard locomotives, i.e. a battery-electric locomotive (BEL) setup, where the batteries are not integrated into a single locomotive. Further, a "vehicle" is used throughout this description, both as an individual integrated unit, and to a collection of multiple locomotives, one or more of which has energy storage that may or may not be integrated into one locomotive having both an engine and an energy storage unit. The definition of "vehicle" can additionally refer to heavy duty trucks wherein the energy storage units may be placed in a trailer that is connected to the tractor between the normal cargo trailers, essentially making it a "road train". In other words, the definition of "hybrid vehicles" include energy storage units that may not necessarily be integrated into the single power unit of a heavy-duty truck and rather can exist as separate, detachable, assets. Further, the definition of "vehicle" can additionally refer to any other vehicles including trucks/OHV/autos and autonomous vehicles. The "altitude and terrain" refer to and include the details associated with the tracks such as the grades, track radius on curves, etc. on which a locomotive typically travels.

Figure 1:
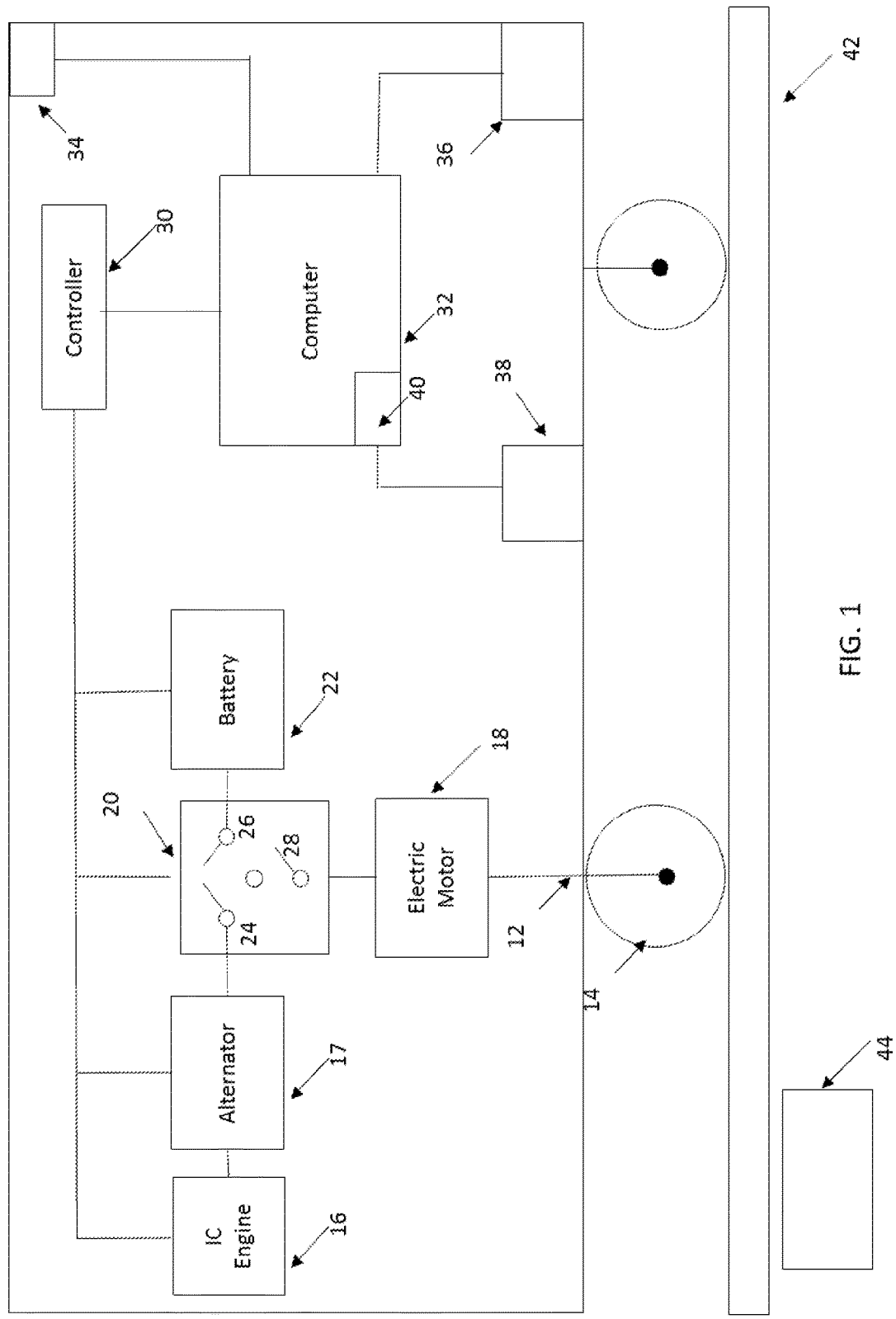
FIG. 1 is a block diagram illustrating a hybrid propulsion system deployed in a locomotive traction system incorporating embodiments of the invention.

FIG. 1 illustrates a representative layout for a locomotive integrated into a single consist and the large equipment used in several embodiments of the current invention that typically includes an electric drive system. With reference to exemplary diesel-electric locomotives, an electric motor is always part of a propulsion system, with or without batteries. Exemplary electric drive system typically includes an engine (such as an internal combustion engine or IC engine) connected to an alternator, which in turn is connected to the electric traction motors that supply the motive force required to turn the wheels of the train. Further, several possible arrangements of the devices, systems and components described below are pertinent typically to locomotives or large off-road vehicle applications that reflect the use of electric drive for all predetermined routes of travel.

Referring to FIG. 1, a hybrid propulsion system 10 incorporating embodiments of the invention includes an engine 16 that is connected to an alternator 17 that supplies electrical power on the locomotive electrical grid to a number of electric (traction) motors 18 through a number of corresponding power transmission lines 12 and a bank of switching elements 20. Electric motor 18 is also coupled to a battery or bank of batteries 22 by means of the bank of switching elements 20. The bank of switching elements 20 are illustrated as a set of switches 24, 26, 28, that selectively couple the electric motor 18 with the engine 16 or the battery 22 or both of the engine 16 and the batteries 22. Switches 24, 26, 28, are selectively controlled by a controller 30 that is coupled to a computer 32.

Figure 2:
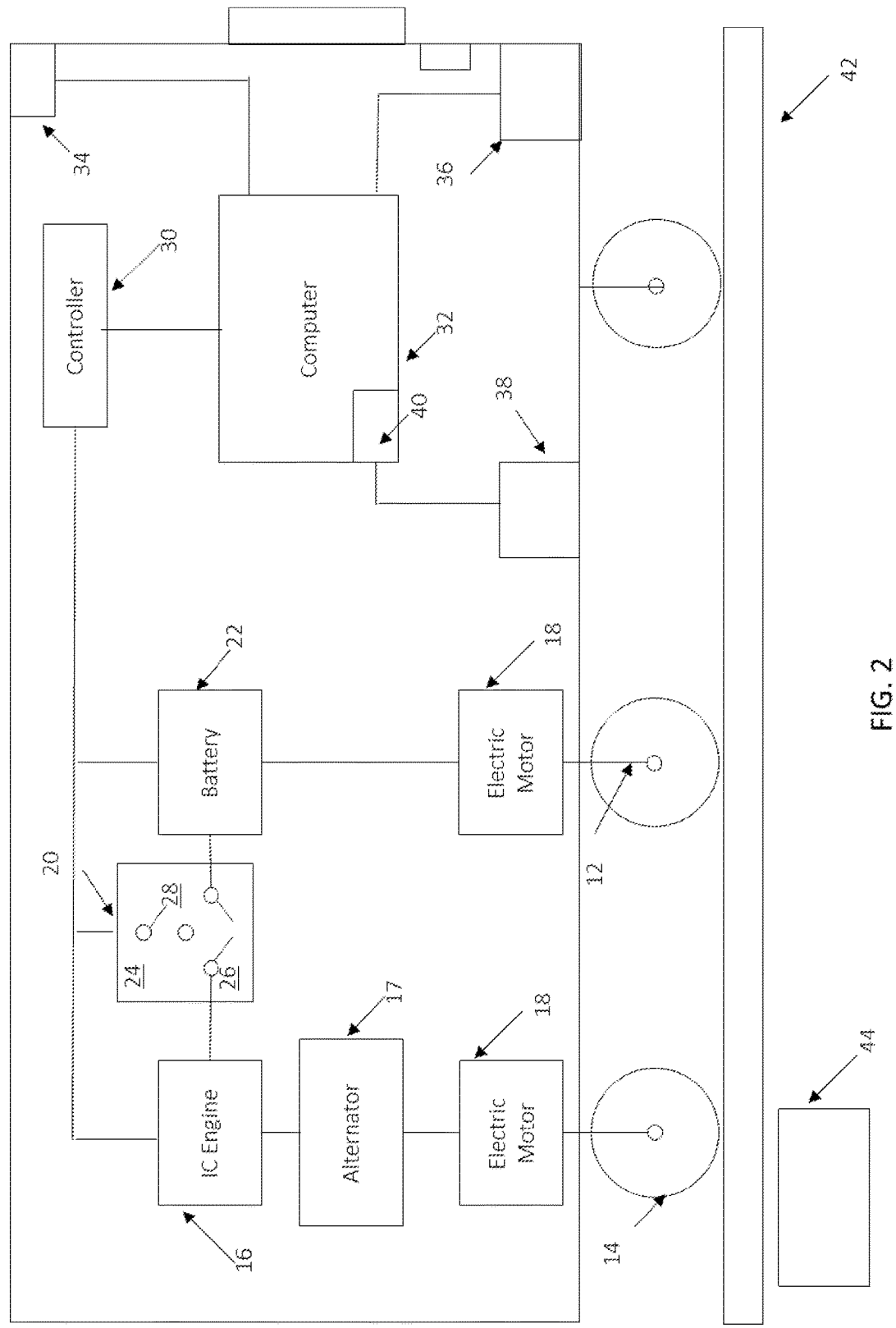
FIG. 2 is a block diagram illustrating a hybrid propulsion system deployed in a locomotive traction system incorporating an alternative embodiment of the invention.

FIG. 2 is an alternative embodiment using a separate battery-electric locomotive within a consist. In this exemplary embodiment of the invention, engine 16 is coupled to the electric motor 18, as illustrated, via alternator 17 by means of a power transmission line 12. In operation, switches 24, 26, 28, of hybrid propulsion system 10 may selectively couple the electric motor 18 either to the engine 16 via the alternator 17 or the bank of batteries 22 or both the engine 16 and the bank of batteries 22. Thus, by closing switches 24 and 26 and opening switch 28, as an example, engine 16 is coupled to the corresponding electric motor 18 and may impart power thereto. Independently, in the battery compartment, by closing switches 24 and 28 and opening switch 26, bank of batteries 22 is coupled to the corresponding electric motor 18 and may directly draw power therefrom.

In another alternative embodiment of the invention, in some passenger cars for instance, the engine drive system may use a mechanical drive system. In one such embodiment of the invention, the engine 16 may be connected to the electric motor 18 via mechanical transmissions. In these embodiments, switches 24, 26, 28, are mechanical clutches, gear trains, and the like, configured to impart mechanical power to the electric motor 18.

FIG. 1 and FIG. 2 further illustrate a computer 32, configured to receive information from a locator element 34, a track characterizing element 36, and sensors 38. A control algorithm 40 operates within the computer 32 and is configured to generate a trip plan according to embodiments of the invention. The hybrid propulsion system 10 is positioned on a track 42, and information may be transmitted to the hybrid propulsion system 10 via wireless communication from a central or an exemplary wayside location 44. The control algorithm 40 is used to compute an optimized trip plan based on current as well as forecast ambient conditions and parameters involving the hybrid propulsion system 10, track 42, such as number of weather forecast conditions such as temperature and pressure forecasts at several points along the route of travel, a number of locomotives, total load, and the like. The control algorithm 40 also takes into account objectives of the mission that may include selection of power source under varying weather conditions, travel time, maximum power setting, maximum speed limits, exhaust emission, an amount of throttle transitions of the hybrid propulsion system, or the like.

In an exemplary embodiment, the trip plan is established based on models for train behavior as the hybrid propulsion system 10 moves along the track 42, as a solution of non-linear differential equations derived from physics with simplifying assumptions that are provided in the control algorithm 40. The control algorithm 40 has access to the information from the locator element 34, track characterizing element 36, predetermined route for travel 52 (FIG. 2), weather forecast information module including temperature forecast module 54 and pressure forecast module 56 and/or sensors 38 to create the trip plan minimizing fuel consumption while maintaining emissions within acceptable standards, establishing a desired trip time, and/or ensuring proper crew operating time.

The controller 30 controls switches 24, 26, 28, according to control algorithm 40, as it follows the trip plan, and engages and disengages the electric motor 18 from the engine 16, and/or engages and disengages the electric motor 18 from the bank of batteries 22. In one embodiment of the invention, the controller 30 makes train operating decisions autonomously, and in another embodiment the operator may be involved with directing the train to follow the trip plan.

According to one embodiment of the invention, the trip plan may be modified in real time while being executed. Thus, an initial plan may be determined when a long distance is involved, but owing to the complexity of the plan optimization control algorithm 40 and changing conditions, the plan may be modified accordingly. The control algorithm 40 may also be used to segment the mission wherein the mission may be divided by waypoints. Though only a single control algorithm 40 is discussed, those skilled in the art will readily recognize that more than one control algorithm 40 may be used in series or in parallel.

Figure 3:
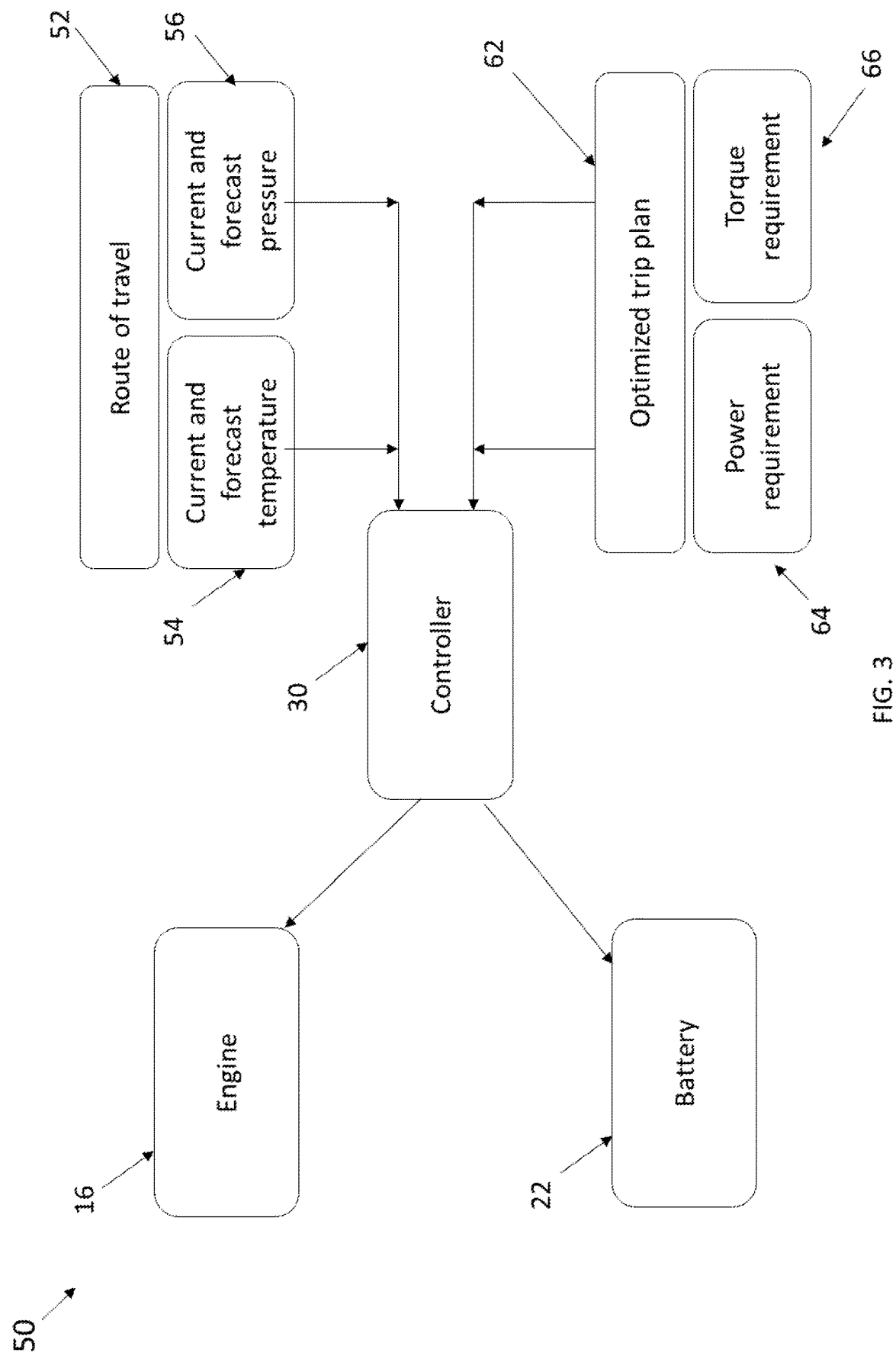
FIG. 3 is a block diagram useful in incorporating embodiments of the invention in the hybrid propulsion system of FIG. 1.

FIG. 3 depicts an exemplary illustration of a block diagram of a system 50 for controlling a hybrid propulsion system 10 (FIG. 1). In one embodiment of the current invention, the hybrid propulsion system is a locomotive. The hybrid propulsion system 10 includes a first source of energy 16 and a second source of energy 22. In one exemplary embodiment of the current invention, the first source is the engine 16 and the second source is the bank of batteries 22. The system 50 further includes the exemplary computer 32 programmed to obtain altitude and terrain information associated with a predetermined route 52 for the hybrid propulsion system 10. The computer 32 is further programmed to obtain ambient weather information associated with the predetermined route 52 of the hybrid propulsion system. The ambient weather information includes temperature information 54 and pressure information 56. The ambient temperature information may be current temperature conditions, and/or the forecast temperature conditions. Likewise, the ambient pressure information may be current pressure conditions, and/or the forecast pressure conditions.

The computer 32 is further programmed to generate a trip plan 62 optimizing a number of performance parameters of the hybrid propulsion system 10 as the hybrid propulsion system travels along the predetermined route 52 and preferentially select either the engine or the bank of batteries or both on the trip plan 62. Furthermore, the computer 32 is programmed to generate the trip plan based on an objective function that includes factors of interest such as power requirement 64 and torque requirement 66 along the predetermined route 52, life of the engine as an exemplary embodiment of a first energy utilization system utilizing the engine fuel as a source of energy for the power and torque requirement of the hybrid propulsion system 10, life of the bank of batteries as an exemplary embodiment of a second utilization system of the batteries as a source of energy for the power and torque requirement of the hybrid propulsion system 10, state of charge of the bank of batteries, travel time, maximum power setting, speed limit, and exhaust emission limits stipulated for the hybrid propulsion system 10. In another embodiment of the invention, several other performance parameters such as consumption of energy from the engine fuel and the battery charge as a function of output power, locomotive power data, performance of propulsion system traction transmission, and cooling characteristics of the hybrid propulsion system 10 that may be taken into account while optimizing the trip plan 62.

In another embodiment of the invention, the computer 32 may be caused to revise the trip plan 62 based on ambient weather conditions that occur while the propulsion system is traveling from a first point to a second point. The computer 32 is configured to obtain the altitude, terrain and weather information from a computer that is remotely located from the hybrid propulsion system.

As illustrated, instructions are input specific to planning a trip either on board or from a remote location, such as a dispatch center with instructions. Such input information includes, but is not limited to, train position, consist description (i.e. one or more locomotives in succession), locomotive power description, regenerative braking characteristics, performance of locomotive traction transmission, consumption of energy from the engine fuel as a function of output power, cooling characteristics, the intended trip route (effective track grade and curvature as function of milepost or an "effective grade" component to reflect curvature following standard railroad practices), the train represented by car makeup and loading together with effective drag coefficients, trip desired parameters including, but not limited to, start time and location, end location, desired travel time, crew (user and/or operator) identification, crew shift expiration time, and route.

This data may be provided to the hybrid propulsion system 10 in a number of ways, such as, but not limited to, an operator manually entering this data into the hybrid propulsion system 10 via an onboard display, inserting a memory device such as a hard card and/or USB drive containing the data into a receptacle aboard the locomotive, or transmitting the information via wireless communication from central or a wayside location 44 (illustrated in FIG. 1), such as a track signaling device and/or a wayside device, to the hybrid propulsion system 10. Hybrid propulsion system 10 load characteristics (e.g., drag) may change over the route (e.g., with altitude, ambient temperature and condition of the rails and rail-cars), and the plan may be updated to reflect such changes as needed by, such as, real-time autonomous collection of locomotive/train conditions. This includes for example, changes in hybrid propulsion system 10 characteristics detected by monitoring equipment on or off board the hybrid propulsion system 10.

Based on the specification data, an optimal plan which minimizes fuel use subject to speed limit constraints, emissions limits, life of the engine as an exemplary embodiment of a first energy utilization system utilizing the engine fuel as a source of energy for the power and torque requirement of the hybrid propulsion system, life of the bank of batteries as an exemplary embodiment of a second utilization system of the batteries as a source of energy for the power and torque requirement of the hybrid propulsion system, the state of charge of the bank of batteries and the like, along the route, with desired start and end times, is computed to produce a trip power source selection schedule. The trip power source selection schedule includes, according to a preferred embodiment of the invention and as will be discussed later, periods where preferential selection of the power source is encouraged to happen to take advantage of the prior knowledge of the weather conditions exemplified by the temperature and pressure conditions along the route of travel of the hybrid propulsion system 10. The plan contains the selection schedule between the engine and the batteries along with optimal speed and power (notch) settings the train is to follow, expressed as a function of distance and/or time, and such train operating limits, including but not limited to, maximum notch power and brake settings, speed limits as a function of location, and the expected fuel used and emissions generated.

In another embodiment, instead of operating at the traditional discrete notch power settings, the computer 32 is able to select a continuous power setting determined as optimal for the power source selection schedule selected. Thus, for example, if an optimal power source selection schedule specifies a power setting that falls between the traditional notch setting, e.g. an effective notch 6.8, instead of operating at notch setting 7, the hybrid propulsion system 10 can operate at a power consistent with the effective notch 6.8 to further improve efficiency thereof.

The procedure used to compute the optimal power source selection schedule can be any number of methods for computing a power sequence that drives the hybrid propulsion system 10 to minimize fuel subject to locomotive operating conditions, life of the engine as an exemplary embodiment of a first energy utilization system utilizing the engine fuel as a source of energy for the power and torque requirement of the hybrid propulsion system 10, life of the bank of batteries as an exemplary embodiment of a second utilization system of the batteries as a source of energy for the power and torque requirement of the hybrid propulsion system 10, state of charge of bank of batteries, the emissions, schedule constraints, or the like. In some cases, the optimal power source selection schedule may be close enough to one previously determined, owing to the similarity of the train configuration, route and environmental conditions. In these cases, it may be sufficient to look up the driving trajectory within a database of previously executed trip plans and follow it. When no previously computed plan is available or suitable, methods to compute a new one include, but are not limited to, direct calculation of the optimal power source selection schedule using differential equation models which approximate the train physics of motion. The setup involves selection of a quantitative objective function, or a weighted sum (integral) of model variables that correspond to travel time, rate of fuel consumption, maximum power settings, speed limits, emissions generation, plus a term to penalize excessive throttle variation or jockeying, as examples.

Depending on planning objectives at any time, the problem may be setup flexibly to minimize fuel subject to constraints on emissions and speed limits, or to minimize emissions, subject to constraints on fuel use and arrival time, as examples. It is also possible to setup, for example, a goal to minimize the total travel time without constraints on total emissions or fuel use where such relaxation of constraints would be permitted or required for the mission.

Using this model, an optimal control formulation is set up to minimize the quantitative objective function subject to constraints including but not limited to, speed limits and minimum and maximum power (throttle) settings. Depending on planning objectives at any time, the problem may be setup flexibly to minimize fuel subject to constraints on emissions and speed limits, or to minimize emissions, subject to constraints on fuel use and arrival time.

In operation, a control strategy is adopted for the hybrid propulsion system 10 to supply its power as well as torque requirement either by the engine 16 or the batteries 22 or both, based at least partially on the ambient conditions (temperature and pressure). Knowing the ambient conditions ahead of time, a trip plan 62 can be put in place that preferentially use the battery and/or the engine power to reduce the fuel consumed and extend the life of the engine and/or the battery.

In particular, the exemplary computer 32 is programmed to use the knowledge of an upcoming trip and ambient weather conditions to preferentially select how to use power from the engine 16 and the battery 22. For instance, knowing the specific elevation or altitude requirements associated with a trip may typically give an indication of the ambient pressure along the predetermined route 52. In one embodiment of the current invention, the relevant control strategy may select to run the engine relatively less at higher elevations and therefore conserve the battery for the same conditions. This can result in reduced engine component wear as higher elevations stress the turbocharger and other components more. Further, the efficiency of the engines typically decrease at higher elevations and therefore, the use of batteries over engines can result in improved fuel consumption. Similar tradeoffs can be made for variations in ambient temperature conditions. For instance, one exemplary control strategy may be to run the batteries less at high ambient temperatures and thereby to extend their life. In other words, a given trip may run the batteries only if needed and/or only when the temperature is not too hot or too cold.

Reference to emissions in the context of one embodiment of the current invention is directed towards cumulative emissions produced in the form of oxides of nitrogen (NOx), unburned hydrocarbons, particulates, and/or the like. If a key objective during a trip mission is to reduce total emissions, control algorithm 40 may be generated or amended to consider this trip objective in conjunction with improved overall fuel efficiency. A key flexibility in the optimization setup is that any or all of the trip objectives can vary by geographic region or mission. For example, for a high priority train, minimum time may be the only objective on one route because it is high priority traffic. In another example emission output could vary from state to state along the planned train route.

Referring still to FIG. 3, once the optimized trip plan 62 is generated, power commands are generated to put the plan in motion. Depending on the operational set-up, in one embodiment of the current invention, one command is for the locomotive to follow the optimized power command so as to achieve an optimal speed. The invention obtains actual speed and power information from the locomotive consist of the hybrid propulsion system 10. Owing to the inevitable approximations in the models used for the optimization, a closed-loop calculation of corrections to optimized power is obtained to track the desired optimal speed. Such corrections of train operating limits can be made automatically or by the operator, who traditionally has ultimate control of the train.

In operation, the control algorithm 40 continuously monitors system efficiency and continuously updates the trip plan based on the actual efficiency measured, whenever such an update would improve trip performance. Revising an existing trip plan or completely re-planning computations may be carried out entirely within the locomotive(s) or fully or partially moved to a remote location, such as dispatch or wayside processing facilities where wireless technology is used to communicate the plans to the hybrid propulsion system 10. The invention may also generate efficiency trends that can be used to develop locomotive fleet data regarding efficiency transfer functions. The fleet-wide data may be used when determining the initial trip plan and may be used for network-wide optimization tradeoff when considering locations of a plurality of trains.

Many events in daily operations can lead to a need to generate or modify a currently executing plan, where it is desired to keep the same trip objectives, and for when a train is not on schedule for planned meet or pass with another train and it needs to make up time. Using the actual speed, power and location of the locomotive, a comparison is made between a planned arrival time and the currently estimated (predicted) arrival time, based on the remaining portion of the trip plan. Based on a difference in the times, as well as the difference in parameters (detected or changed by dispatch or the operator), the plan is adjusted. This adjustment may be made automatically or manually following a railroad company's desire for how such departures from the plan should be handled. Whenever a plan is updated, such as but not limited to arrival time, additional changes may be factored in concurrently, e.g. new future speed limit changes, which could affect the feasibility of ever recovering the original plan. In such instances if the original trip plan cannot be maintained, or in other words the train is unable to meet the original trip plan objectives, as discussed herein other trip plan(s) may be presented to the operator and/or remote facility, or dispatch.

Revising an existing trip plan or completely re-planning may also be made when it is desired to change the original objectives. Such plan revision or complete re-planning can be done at either fixed preplanned times, manually at the discretion of the operator or dispatcher, or autonomously when predefined limits, such a train operating limits, are exceeded. For example, if the current plan execution is running late by more than a specified threshold, such as thirty minutes as an example, in one embodiment of the current invention can re-plan the trip to accommodate the delay which is again based on minimizing total fuel consumption for the remaining portion of the trip, based on the new set of parameters. Other triggers for re-plan can also be envisioned based on the health of the power consist, including but not limited time of arrival, loss of horsepower due to equipment failure and/or equipment temporary malfunction (such as operating too hot or too cold), and/or detection of gross setup errors, such in the assumed train load. That is, if the change reflects impairment in the locomotive performance for the current trip, these may be factored into the models and/or equations used in the optimization.

Changes in plan objectives can also arise from a need to coordinate events where the plan for one train compromises the ability of another train to meet objectives and arbitration at a different level, e.g. the dispatch office is required. For example, the coordination of meets and passes may be further optimized through train-to-train communications. Thus, as an example, if a train knows that it is behind in reaching a location for a meet and/or pass, communications from the other train can notify the late train (and/or dispatch). The operator can then enter information pertaining to being late in the computer 32 wherein the control algorithm 40 will recalculate the train's trip plan, again optimizing and minimizing fuel consumption while taking advantage of planned regenerative braking. The control algorithm 40 can also be used at a high level, or network-level, to allow a dispatch to determine which train should slow down or speed up should a scheduled meet and/or pass time constraint may not be met. As discussed herein, this is accomplished by the trains transmitting data to the dispatch to prioritize how each train should change its planning objective. A choice could depend either from schedule or fuel saving benefits, depending on the situation.

For any of the manually or automatically initiated re-plans, the control algorithm 40 may present more than one trip plan to the operator. In an exemplary embodiment of the current invention, the control algorithm 40 will typically present different power source selection schedules to the operator, allowing the operator to select the arrival time and understand the corresponding fuel and/or emission impact. Such information can also be provided to the dispatch for similar consideration, either as a simple list of alternatives or as a plurality of tradeoff curves.

In one embodiment of the current invention, there remains the ability of learning and adapting to key changes in the train and power consist which can be incorporated either in the current plan and/or for future plans. For example, one of the triggers discussed above is loss of horsepower. When building up horsepower over time, either after a loss of horsepower or when beginning a trip, transition logic is utilized to determine when desired horsepower is achieved.

Regardless of the combination of objective functions established and the combination of performance parameters of the hybrid propulsion system used to optimize a trip plan, total fuel efficiency may be improved by encouraging regenerative braking to occur during portions of the route. Thus, when planning a trip power source selection schedule, when revising an existing trip plan or completely re-planning, an optimized trip power source selection schedule may be obtained as outlined in FIG. 3.

Figure 4:
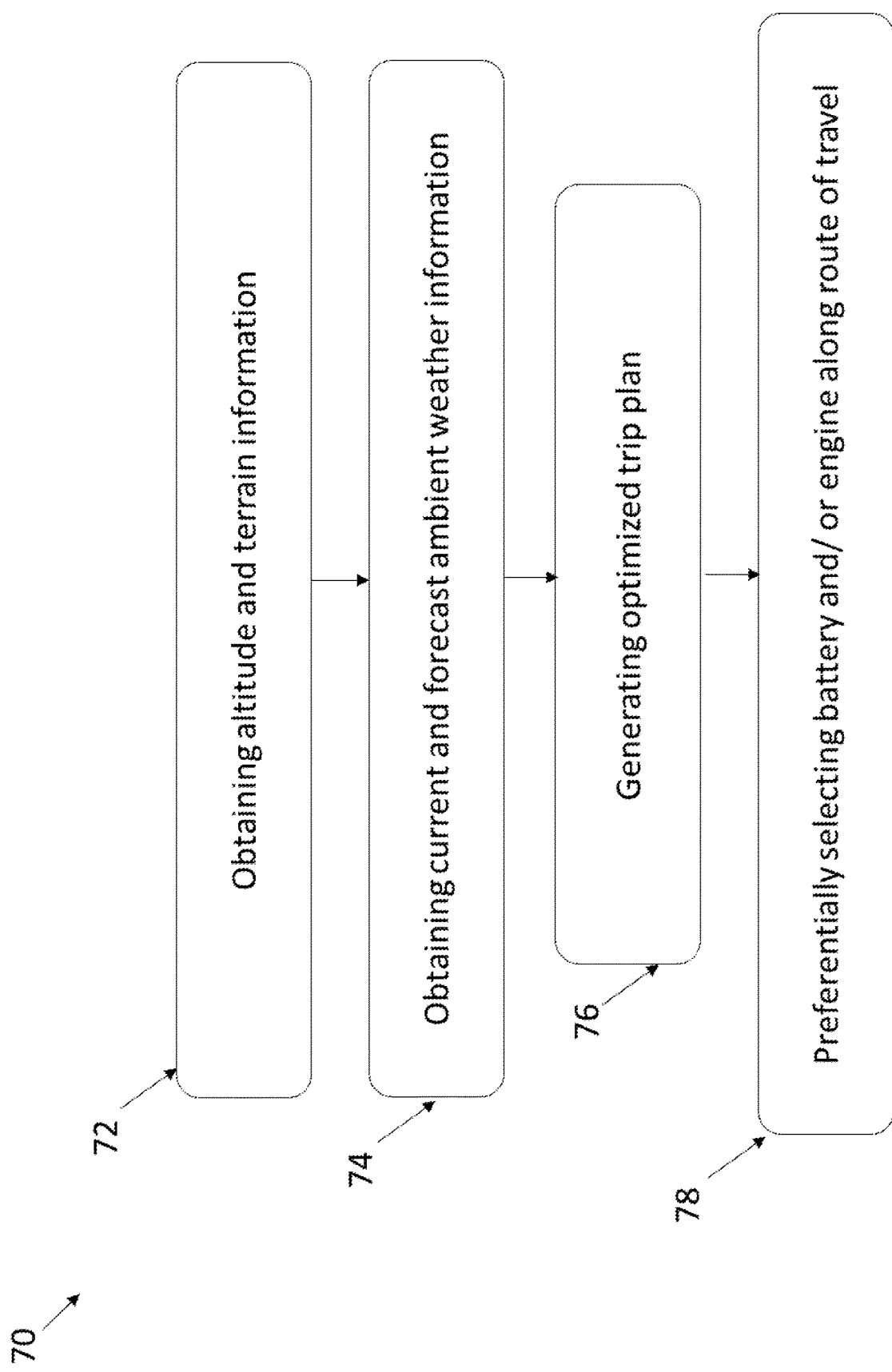
FIG. 4 is a flow chart of a method according to the invention.

Referring now to FIG. 4, a method of controlling a hybrid propulsion system is illustrated as method 70, according to one preferred embodiment of the invention. Method 70 begins by obtaining altitude and terrain information 72 of a predetermined route 52 for the hybrid propulsion system 10, as illustrated in FIG. 1 and FIG. 2. The method 70 further includes obtaining ambient weather information 74 along the predetermined route 52 of the hybrid propulsion system 10. The ambient weather information includes current and/or forecast information related to temperature and pressure values along the predetermined route 52.

The method 70 further includes generating a trip plan 76 optimizing a number of operational parameters of the hybrid propulsion system 10 as the hybrid propulsion system 10 travels along the predetermined route 52. The trip plan is typically generated based on an objective function that includes parameters such as life of the batteries, life of the engine, state of charge (SOC) of the bank of batteries, a travel time, a maximum power setting, a speed limit, and an exhaust emission of the hybrid propulsion system.

In one embodiment of the invention, the method 70 includes obtaining objective trip criteria which constrain the optimization. The objective trip criteria may include, but are not limited to, a travel time, a maximum power setting, a speed limit, and an exhaust emission of the hybrid propulsion system. The trip plan may also be generated and optimized by encouraging or promoting regenerative braking to occur to optimize power stored in the batteries. Such optimization may occur, according to the invention, irrespective of momentum or braking requirements of the hybrid propulsion system 10 during periods of the trip. The optimized trip plan may also include drawing down the batteries during portions of the trip such that adequate storage capacity is available in the batteries in advance of a regenerative braking period. Thus, a total trip may be optimized about fuel consumption, and overall fuel efficiency may be improved by generating a trip plan that encourages regenerative braking to occur during portions of the trip that otherwise would not have regenerative braking, all while satisfying the overriding objective trip criteria.

The method 70 further includes preferentially selecting the use of the engine and/or the batteries as in step 78 based on the optimized trip plan 62. A number of performance parameters are taken into consideration while optimizing the trip plan. Exemplary and non-limiting performance parameters include consumption of energy from the first fuel and the second fuel as a function of output power, locomotive power data, performance of propulsion system traction transmission, and cooling characteristics of the hybrid propulsion system. Further, the method 70 may include obtaining vehicle related information, which may include but is not limited to number of locomotives, total load, and the like. Performance parameters may include, but are not limited to, locomotive power data, regenerative braking characteristics, performance of locomotive traction transmission, consumption of energy from the engine fuel as a function of output power, and cooling characteristics of the hybrid propulsion system, as examples. Route data obtained may include a single leg from a first point to a second point, or multiple legs between points. The route data obtained may include altitude and terrain, or grade information that is extracted and used to optimize the trip plan according to the invention.

Controlling the hybrid propulsion system 10 as in method 70 includes revising an existing trip plan or completely re-planning the trip plan based on ambient conditions that occur while the propulsion system 10 is traveling from one point to another along its predetermined route 52. In one embodiment of the current invention, the hybrid propulsion system 10 is a locomotive and the control method 70 may be adapted accordingly.

In operation, a remote facility, such as a dispatch can provide information in accordance with one embodiment of the current invention and thereby the altitude and terrain information as in step 72, and the ambient weather information as in step 74 may be obtained from a computer that is remotely located from the hybrid propulsion system. As illustrated, such information is provided to a controller 30.

Additionally, the controller 30 may be supplied with a locomotive modeling information database, information from a track database such as, but not limited to, track grade information and speed limit information, estimated train parameters such as, but not limited to, train weight and drag coefficients, fuel rate tables from a fuel rate estimator, and battery models that describe battery efficiency and recovery of energy during, for instance, regenerative braking.

In practice, typically, the controller 30 supplies information to a planner, and a trip plan is calculated accordingly. Once a trip plan has been calculated, the plan is supplied to a driving advisor, driver or controller 30. The controller 30 is coupled to a battery management module that controls charging and discharging of the bank of batteries 22 according to the trip plan as executed by the controller 30. The trip plan is also supplied to the controller 30 so that it can compare the trip when other new data is provided.

In one embodiment of the invention, the controller 30 can automatically set a notch power, either a pre-established notch setting or an optimum continuous notch power. In addition to supplying a speed command to the hybrid propulsion system 10, a display is provided so that the operator can view what the planner has recommended. The operator also has access to a control panel. Through the control panel, the operator can decide whether to apply the notch power recommended. Toward this end, the operator may limit a targeted or recommended power. That is, at any time the operator always has final authority over what power setting the locomotive consist will operate at. This includes deciding whether to supply the required power to the hybrid propulsion system 10 from the engine or the batteries under varying weather conditions such as operating in cold or hot territories. Further, where information from wayside equipment cannot electronically transmit information to a train and instead the operator views visual signals from the wayside equipment, the operator inputs commands based on information contained in track database and visual signals from the wayside equipment.

Based on how the hybrid propulsion system 10 is functioning, information regarding fuel measurement is supplied to the fuel rate estimator. Since direct measurement of fuel flows is not typically available in a locomotive consist, information on fuel consumed within a trip, and projections into the future following optimal plans, is carried out using calibrated physics models such as those used in developing the optimal plans. For example, such predictions may include but are not limited to the use of measured gross horse-power and known fuel characteristics to derive the cumulative fuel used.

In one embodiment of the current invention, the hybrid propulsion system 10 may have an exemplary locator element, such as a GPS sensor and location information can be supplied to a train parameters estimator. Such information may include, but is not limited to, GPS sensor data, tractive/braking effort data, braking status data, speed and any changes in speed data. With information regarding grade and speed limit information, train weight and drag coefficients information is supplied to the controller 30.

The invention may also allow for the use of continuously variable power throughout the optimization planning and closed loop control implementation. In a conventional locomotive, power is typically quantized to eight discrete levels. Modern locomotives can realize continuous variation in horsepower which may be incorporated into the previously described optimization methods. With continuous power, the hybrid propulsion system 10 can further optimize operating conditions, e.g., by minimizing auxiliary loads and power transmission losses, and fine-tuning engine horsepower regions of optimum efficiency, or to points of increased emissions margins. Examples include, but are not limited to, minimizing cooling system losses, adjusting alternator voltages, adjusting engine speeds, and reducing number of powered axles. Further, the hybrid propulsion system 10 may use the track database and the forecasted performance requirements to minimize auxiliary loads and power transmission losses to provide optimum efficiency for the target fuel consumption/emissions. Examples include, but are not limited to, reducing a number of powered axles on flat terrain and pre-cooling the locomotive engine prior to entering a tunnel.

The invention may also use the track database and the forecasted performance to adjust the locomotive performance, such as to ensure that the train has sufficient speed as it approaches a hill and/or tunnel. For example, this could be expressed as a speed constraint at a particular location that becomes part of the optimal plan. Additionally, the control algorithm 40 may incorporate train-handling rules, such as, but not limited to, tractive effort ramp rates, maximum braking effort ramp rates. These may incorporated directly into the formulation for optimum trip power source selection schedule or alternatively incorporated into the closed loop regulator used to control power application to achieve the target speed.

In a preferred embodiment the control algorithm 40 is only installed on a lead locomotive of the train consist. However, interaction with multiple trains is not precluded and two or more independently optimized trains may be controlled according to the invention.

Trains with distributed power systems can be operated in several different modes. One mode is where all locomotives in the train operate at the same notch command. Thus, if the lead locomotive is commanding motoring-N8, all units in the train will be commanded to generate motoring-N8 power. Another mode of operation is "independent" control. In this mode, locomotives or sets of locomotives distributed throughout the train can be operated at different motoring or braking powers. For example, as a train crests a mountain-top, the lead locomotives (on the down slope of mountain) may be placed in braking, while the locomotives in the middle or at the end of the train (on the up slope of mountain) may be in motoring. This is done to minimize tensile forces on the mechanical couplers that connect the railcars and locomotives. Traditionally, operating the distributed power system in "independent" mode required the operator to manually command each remote locomotive or set of locomotives via a display in the lead locomotive. Using the physics-based planning model, train set-up information, on-board track database, on-board operating rules, location determination system, real-time closed loop power/brake control, and sensor feedback, the system shall automatically operate the distributed power system in "independent" mode.

When operating in distributed power, the operator in a lead locomotive can control operating functions of remote locomotives in the remote consists via a control system, such as a distributed power control element. Thus, when operating in distributed power, the operator can command each locomotive consist to operate at a different notch power level (or one consist could be in motoring and other could be in braking) wherein each individual locomotive in the locomotive consist operates at the same notch power. In an exemplary embodiment, with the control algorithm 40 installed on the train, preferably in communication with the distributed power control element, when a notch power level for a remote locomotive consist is desired as recommended by the optimized trip plan, the control algorithm 40 will communicate this power setting to the remote locomotive consists for implementation. The same is true regarding braking.

The control algorithm 40 may be used with consists in which the locomotives are not contiguous, e.g., with one or more locomotives up front, others in the middle and at the rear for train. Such configurations are called distributed power wherein the standard connection between the locomotives is replaced by radio link or auxiliary cable to link the locomotives externally.

In an exemplary embodiment, with the invention installed on the train, preferably in communication with the distributed power control element, when a notch power level for a remote locomotive consist is desired as recommended by the trip plan, the control algorithm 40 will typically communicate this power setting to the remote locomotive consists for implementation. The same is true regarding braking. When operating with distributed power, the optimization problem previously described can be enhanced to allow additional degrees of freedom, in that each of the remote units can be independently controlled from the lead unit. The value of this is that additional objectives or constraints relating to in-train forces may be incorporated into the performance function, assuming the model to reflect the in-train forces is also included. Thus, the invention may include the use of multiple throttle controls to better manage in-train forces as well as fuel consumption and emissions. In such an embodiment, weather integrated trip optimization enhances overall fuel efficiency by, for instance, supply power from engine to one locomotive while simultaneously supplying from the batteries to another.

In a train utilizing a consist manager, the lead locomotive in a locomotive consist may operate at a different notch power setting than other locomotives in that consist. The other locomotives in the consist operate at the same notch power setting. The invention may be utilized in conjunction with the consist manager to command notch power settings and regenerative braking commands for the locomotives in the consist. Thus, based on the invention and as an example, because the consist manager divides a locomotive consist into two groups, lead locomotive and trail units, the lead locomotive will be commanded to operate at a certain notch power and the trail locomotives are commanded to operate at another certain notch power. In an exemplary embodiment the distributed power control element may be the system and/or apparatus where this operation is housed.

Likewise, when a consist optimizer is used with a locomotive consist, the control algorithm 40 can be used in conjunction with the consist optimizer to determine notch power for each locomotive in the locomotive consist, thus providing the overall required net power. For example, suppose that a trip plan recommends a notch power setting of 4 for the locomotive consist. Based on the location of the train, the consist optimizer will take this information and then determine the notch power setting for each locomotive in the consist. In this implementation, the efficiency of setting notch power settings over intra-train communication channels is improved. Furthermore, as discussed above, implementation of this configuration may be performed utilizing the distributed control system.

Additionally, in an embodiment of the invention, the trip optimizer algorithm described herein may, for periods of the trip, force the engine to operate in less efficient modes (such as a peak power of the internal combustion engine in conjunction with drawing from the batteries). Such operation may be to make up for lost time or to provide additional acceleration capability than can be provided by the internal combustion engines alone. However, in such embodiments, although short periods of decreased efficiency may occur, overall efficiency is improved, as the trip optimizer takes full account of combined efficiencies during the planned trip.

Furthermore, as discussed previously, the control algorithm may be used for continuous corrections and revision of an existing trip plan or complete re-planning with respect to when the train consist uses which source of power based on upcoming items of interest, such as but not limited to railroad crossings, grade changes, approaching sidings, approaching depot yards, and approaching fuel stations where each locomotive in the consist may require a different braking option. For example, if the train is coming over a hill (at higher altitude and usually lower temperature, with possible exceptions), the lead locomotive may be supplied with power from the batteries whereas the remote locomotives, having not reached the peak of the hill may have to remain in a motoring state and supplied with power from the engine.

A technical contribution for the disclosed method and apparatus is that it provides for a computer configured to operate a hybrid propulsion system and access a navigation database system and to a method of using the system.

According to one embodiment of the invention, a system for controlling a hybrid propulsion system includes a computer programmed to obtain altitude and terrain information associated with a predetermined route for the hybrid propulsion system comprising a first energy source and a second energy source. The computer is also programmed to obtain current and forecast ambient weather information associated with the predetermined route of the hybrid propulsion system, determine a power requirement and a torque requirement of the hybrid propulsion system associated with the altitude and the terrain along the predetermined route of the hybrid propulsion system, generate a trip plan to optimize at least one of a plurality of performance parameters of the hybrid propulsion system as the hybrid propulsion system travels along the predetermined route, and preferentially select the first energy source and/or the second energy source based on the trip plan.

In accordance with another embodiment of the invention, a method of controlling a hybrid propulsion system includes obtaining altitude and terrain information of a predetermined route for the hybrid propulsion system to travel comprising a first energy source and a second energy source. The method also includes obtaining ambient weather information along the predetermined route of the hybrid propulsion system, determining a power requirement and a torque requirement of the hybrid propulsion system associated with the altitude and the terrain along the predetermined route of the hybrid propulsion system, generating a trip plan optimizing a plurality of operational parameters of the hybrid propulsion system as the hybrid propulsion system travels along the predetermined route, and preferentially selecting the first energy source and/or the second energy source based on the trip plan.

In accordance with yet another embodiment of the invention, a propulsion system includes a hybrid power source to provide power to drive the propulsion system via a power transmission line, the hybrid power source comprising an internal combustion (IC) engine and an electric motor, wherein the IC engine is coupled to the power transmission line, a bank of batteries coupled to the electric motor, a selection device and a computer. The selection device is arranged to selectively couple the electric motor to the power transmission line.

The propulsion system also includes a computer configured to obtain altitude and terrain information associated with a predetermined route for the hybrid propulsion system that includes a first energy source and a second energy source and to obtain ambient weather information associated with the predetermined route of the hybrid propulsion system. The computer is also configured to determine a power requirement and a torque requirement of the hybrid propulsion system associated with the altitude and the terrain along the predetermined route of the hybrid propulsion system and generate a trip plan to optimize at least one of a plurality of performance parameters of the hybrid propulsion system as the hybrid propulsion system travels along the predetermined route, and preferentially select the first energy source and/or the second energy source based on the trip plan.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not limited by the foregoing description, but is only limited by the scope of the appended claims.

What is claimed is:

1. A system for controlling a hybrid propulsion system, comprising a computer programmed to:
    obtain altitude and terrain information associated with a predetermined route for the hybrid propulsion system comprising a first energy source and a second energy source;
    obtain ambient weather information associated with the predetermined route of the hybrid propulsion system, wherein the ambient weather information comprises current and forecast ambient weather conditions including current temperature, current pressure, forecast pressure, and forecast pressure at several points along the predetermined route;
    determine a power requirement and a torque requirement of the hybrid propulsion system associated with the altitude, the terrain, and the ambient weather conditions along the predetermined route of the hybrid propulsion system;
    generate a trip plan to optimize at least one of a plurality of performance parameters of the hybrid propulsion system as the hybrid propulsion system travels along the predetermined route; and
    preferentially select at least one of: the first energy source and the second energy source based on the trip plan to deliver at least one of: the power requirement and the torque requirement of the hybrid propulsion system.

2. The system of claim 1, wherein the at least one performance parameter includes consumption of energy from the first energy source and the second energy source as a function of output power, power data, performance of vehicle traction transmission, and cooling characteristics of the hybrid propulsion system.

3. The system of claim 1, wherein the computer is programmed to generate the trip plan based on at least one objective function.

4. The system of claim 3, wherein the at least one objective function includes at least one of: a life of a first energy source utilization system, a life of a second energy source utilization system, a state of charge of a battery, a travel time, a maximum power setting, a speed limit, and an exhaust emission of the hybrid propulsion system.

5. The system of claim 1, wherein the computer is further caused to revise the trip plan based on the ambient weather conditions that occur while the propulsion system is traveling from a first point to a second point.

6. The system of claim 1, wherein the computer is configured to obtain the altitude, terrain and the ambient weather information from a computer that is remotely located from the hybrid propulsion system.

7. The system of claim 1, wherein the first energy source is an engine and the second energy source is a bank of batteries.

8. The system of claim 1 wherein the hybrid propulsion system is for a vehicle.

9. The system of claim 1, wherein the computer is programmed to:
    generate the trip plan to optimize the plurality of performance parameters of the hybrid propulsion system as the hybrid propulsion system travels along the predetermined route; and
    preferentially select at least one of: the first energy source and the second energy source based on the trip plan to deliver the power requirement and the torque requirement of the hybrid propulsion system.

10. A method of controlling a hybrid propulsion system comprising:
    obtaining altitude and terrain information of a predetermined route for the hybrid propulsion system to travel comprising a first energy source and a second energy source;
    obtaining ambient weather information along the predetermined route of the hybrid propulsion system, wherein the ambient weather information comprises current and forecast ambient weather conditions including current temperature, current pressure, forecast pressure, and forecast pressure at several points along the predetermined route;
    determining a power requirement and a torque requirement of the hybrid propulsion system associated with the altitude, the terrain, and the ambient weather conditions along the predetermined route of the hybrid propulsion system;
    generating a trip plan optimizing a plurality of operational parameters of the hybrid propulsion system as the hybrid propulsion system travels along the predetermined route; and
    preferentially selecting at least one of: the first energy source and the second energy source based on the trip plan to deliver at least one of: the power requirement and the torque requirement of the hybrid propulsion system.

11. The method of claim 10, wherein at least one of the plurality of operational parameters includes consumption of energy from the first energy source and the second energy source as a function of output power, power data, performance of vehicle traction transmission, or cooling characteristics of the hybrid propulsion system.

12. The method of claim 10, wherein generating the trip plan comprises generating the trip plan based on at least one objective function.

13. The method of claim 12, wherein the at least one objective function includes at least one of: a life of a first energy source utilization system, a life of a second energy source utilization system, a state of charge of a battery, a travel time, a maximum power setting, a speed limit, and an exhaust emission of the hybrid propulsion system.

14. The method of claim 10, wherein the controlling comprises revising the trip plan based on the ambient weather conditions that occur while the propulsion system is traveling from a first point to a second point.

15. The method of claim 10, wherein the obtaining altitude and terrain information, and the obtaining the ambient weather information comprises obtaining from a computer that is remotely located from the hybrid propulsion system.

16. The method of claim 10, wherein the first energy source is an engine and the second energy source is a bank of batteries.

17. The method of claim 10, wherein the hybrid propulsion system is for a vehicle.

18. The method of claim 10, wherein the generating comprises generating the trip plan optimizing the plurality of operational parameters of the hybrid propulsion system as the hybrid propulsion system travels along the predetermined route, and wherein the preferentially selecting comprises preferentially selecting at least one of: the first energy source and the second energy source based on the trip plan to deliver the power requirement and the torque requirement of the hybrid propulsion system.

19. A propulsion system comprising:
a hybrid power source to provide power to drive the propulsion system via a power transmission line, the hybrid power source comprising an internal combustion (IC) engine and an electric motor, wherein the IC engine is coupled to the power transmission line;
a bank of batteries coupled to the electric motor;
a selection device arranged to selectively:
couple the electric motor to the power transmission line; and
a computer configured to:
obtain altitude and terrain information associated with a predetermined route for the propulsion system comprising a first energy source and a second energy source;
obtain ambient weather information associated with the predetermined route of the propulsion system, wherein the ambient weather information comprises current and forecast ambient weather conditions including current temperature, current pressure, forecast pressure, and forecast pressure at several points along the predetermined route;
determine a power requirement and a torque requirement of the propulsion system associated with the altitude, the terrain, and the ambient weather conditions along the predetermined route of the propulsion system;
generate a trip plan to optimize at least one of a plurality of performance parameters of the propulsion system as the propulsion system travels along the predetermined route; and
preferentially select at least one of: the first energy source and the second energy source based on the trip plan to deliver at least one of: the power requirement and the torque requirement of the propulsion system.

20. The propulsion system of claim 19, wherein the at least one performance parameter includes consumption of energy from the first energy source and the second energy source as a function of output power, power data, performance of vehicle traction transmission, and cooling characteristics of the hybrid propulsion system.

21. The propulsion system of claim 19, wherein the computer is programmed to generate the trip plan based on at least one of: a life of a first energy source utilization system, a life of a second energy source utilization system, a state of charge of a battery, a travel time, a maximum power setting, a speed limit, and an exhaust emission of the hybrid propulsion system.

22. The propulsion system of claim 19, wherein the computer is configured to:
generate the trip plan to optimize the plurality of performance parameters of the hybrid propulsion system as the hybrid propulsion system travels along the predetermined route; and
preferentially select at least one of: the first energy source and the second energy source based on the trip plan to deliver the power requirement and the torque requirement of the hybrid propulsion system.

* * * * *